Sept. 1, 1970    R. D. ROBINSON    3,526,777
REFLECTANCE MEASURING APPARATUS INCLUDING A MASK
FOR COMPENSATING FOR MOVEMENT OF THE SPECIMEN
Filed April 25, 1968    2 Sheets-Sheet 1
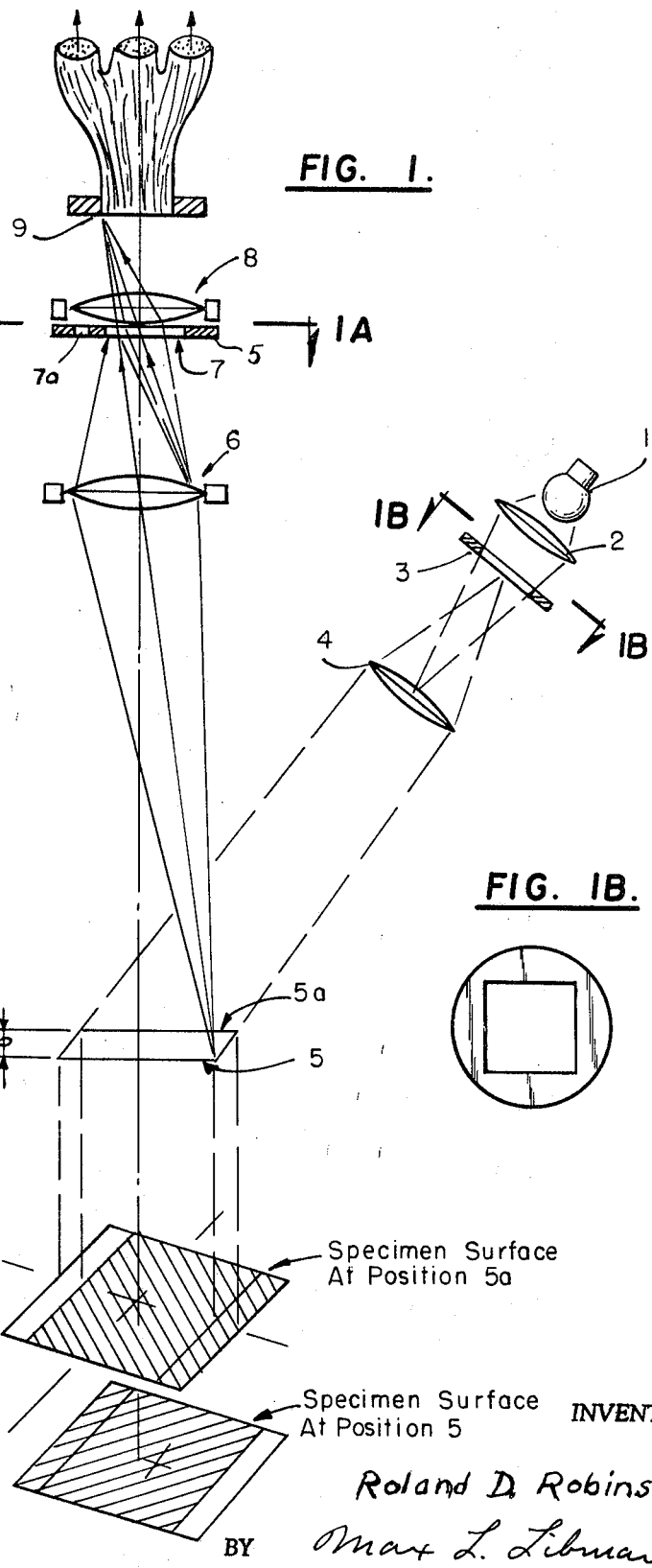
INVENTOR
Roland D. Robinson
BY Max L. Libman
ATTORNEY

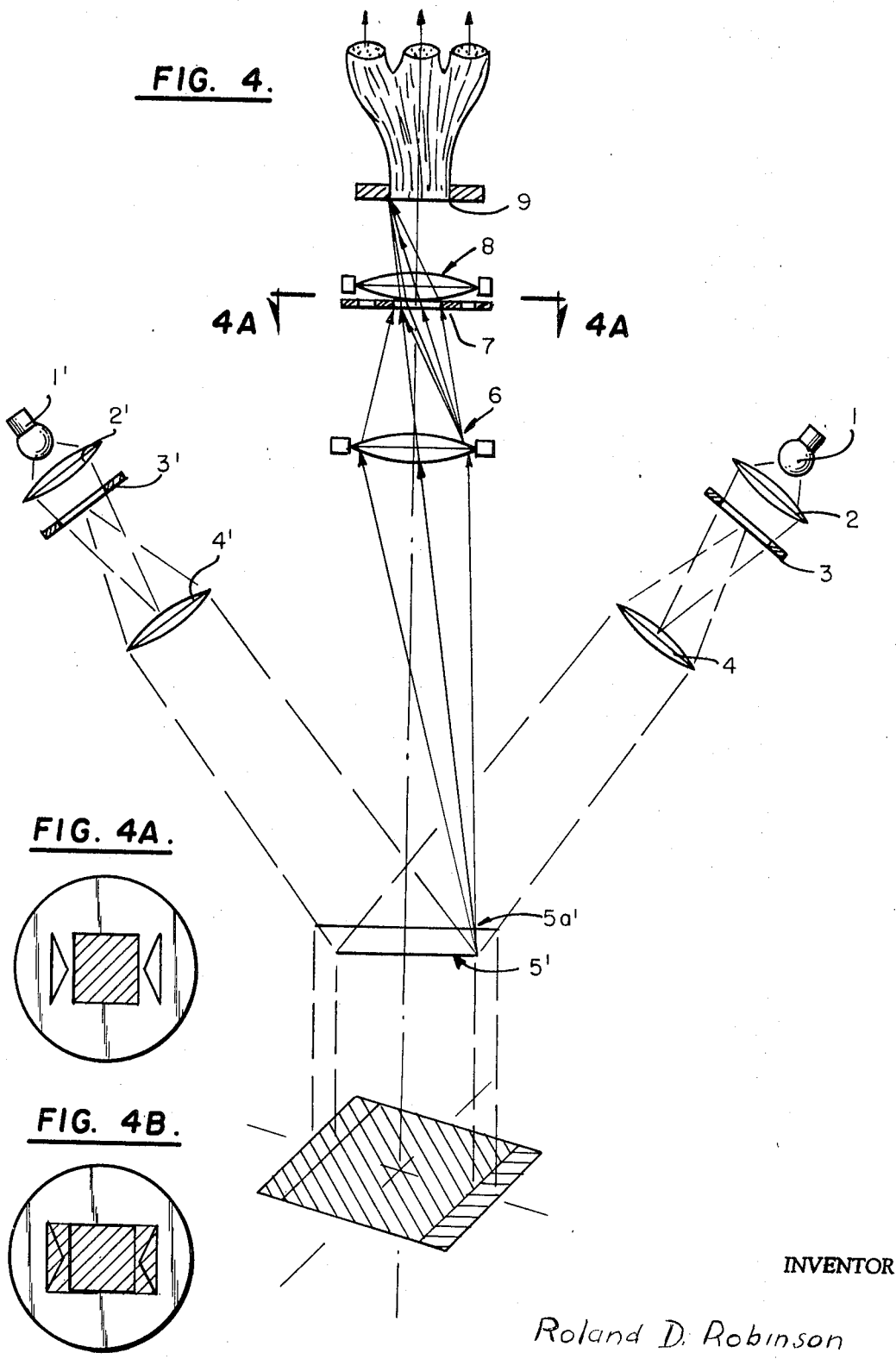

United States Patent Office 3,526,777
Patented Sept. 1, 1970

3,526,777
REFLECTANCE MEASURING APPARATUS INCLUDING A MASK FOR COMPENSATING FOR MOVEMENT OF THE SPECIMEN
Roland D. Robinson, Springfield, Va., assignor to Hunter Associates Laboratory, Inc., a corporation of Virginia
Filed Apr. 25, 1968, Ser. No. 724,151
Int. Cl. G01n 21/18
U.S. Cl. 250—237                                    5 Claims

ABSTRACT OF THE DISCLOSURE

In certain instruments such as on line reflectometers and color monitors where a product such as paper is being examined at a station in the line of the manufacturing process, it is necessary that variations in distance of the product from the sensing element (e.g. due to sag or flutter in the paper web) should not affect or influence the photometric information received at the detector. A system is presented which compensates for specified changes in distance by means of a series of lenses and apertures.

BACKGROUND OF THE INVENTION

The illuminance E in foot-candles of an object or specimen from a non-directional light source with luminous intensity I in candles at a distance $d$ in feet can be found by $$E = I/d^2$$

This equation is known as the inverse square law where illuminance is proportional to the luminous intensity and is inversely proportional to the square of the distance.

In an illuminance compensating optical system where the luminous intensity I remains constant, the illuminance E will remain constant at the desired detector within a specified change in distance $\Delta d$. However, in measuring optical characteristics such as color of a continuously moving web or sheet of material such as paper, cloth, etc., where practical considerations such as available space, accessibility, etc. require the measuring apparatus to be located above an unsupported section of moving web, it is impractical to maintain the surface being measured at a precisely fixed distance from the measuring apparatus due to sagging of the web under different conditions of operation such as temperature, moisture and machine adjustment; also, the web often flutters due to its high speed and this continuously changes its distance from the measuring apparatus.

It is a major object of the present invention to automatically compensate for such distance variations.

SUMMARY OF THE INVENTION

According to the present invention, changes in distance between a surface being optically measured by means of reflected light from a fixed source and the measuring apparatus are automatically compensated for by an arrangement of lenses and apertures such that as the surface moves closer to the light source and to the measuring apparatus, the amount of light which is permitted to pass through certain apertures to the measuring apparatus is reduced in such manner as to provide the desired compensation.

The specific nature of the invention, as well as other objects and advantages thereof, will clearly appear from a preferred embodiment as shown in the accompanying drawings, in which:

FIG. 1 is a schematic diagram illustrating the principle of the invention;

FIG. 1A is a view taken on line 1A—1A of FIG. 1 showing the shape of the apertures in the mask;

FIG. 1B is a similar view taken on line 1B—1B of FIG. 1;

FIG. 2 is a diagram showing the correspondance of the image and mask aperture in one position of the specimen;

FIG. 3 is a drawing similar to FIG. 2, but showing relative position of the image and the apertures as the specimen moves closer to the measuring apparatus; and FIGS. 4, 4A and 4B are schematic drawings showing the use of more than one light source.

FIG. 1 shows the components of a one beam compensating system. The source of light is the lamp located at position 1. The source condenser lens 2 gathers a large amount of the light from the lamp and distributes it uniformly through the aperture 3. This aperture determines the size and shape of the light incident on the specimen surface 5, forming, in effect, a light picture on the specimen in accordance with the configuration of aperture 3. Source projection lens 4 focuses the light pattern from aperture 3 onto the specimen surface. This lens also collimates the light beam as it travels to the specimen surface. The diffused reflected light from the specimen surface 5 is focused onto aperture 7 of mask 5 by receptor projection lens 6. Depending on the position of the specimen within the range $\Delta d$, aperture 7 provides a "gating effect" to the focused reflected light from the specimen surface. Lens 8 focuses the scrambled image that exists at lens 6 and which is allowed to pass through aperture 7 onto the surface of the sensing element, or in this case a fiber bundle 9, through which the light is carried to the measuring apparatus of known type, which is not a part of the present invention, and therefore is not shown in detail, although the type of measuring apparatus as shown in copending patent application of Hunter et al., Ser. No. 705,702 and in U.S. patent to Hunter, No. 3,003,388 is representative of optical measuring equipment with which the present invention is useful. Lens 8 could be omitted where a single sensor is used, but is useful in the type of receiving surface shown in order to uniformly integrate the reflected light over the large surface of the fiber bundle, thus allowing uniform proportioning of the energy to the subdivisions of fibers.

When the specimen surface is raised from position 5 to 5a (see FIG. 1), a number of changes take place. First, the light pattern determined by aperture 3 on the specimen surface moves along the specimen surface in a direction normal to the path of travel of the surface and toward the light source. Next, since the surface is getting closer to the light source, the intensity of the light on the specimen surface increases in accordance with the inverse square law. Due to this increase in light intensity at the surface and to a similar decrease in distance between the surface and aperture 7, the light intensity at this aperture will also increase, which is undesirable. Finally, since the light pattern on the specimen surface moves toward the light source, the focused pattern of the light from the specimen surface on aperture 7 will move across the aperture (from right to left in FIG. 1) away from the source, due to inversion produced by the lens. It is this lateral movement of the reflected light image from the specimen surface on aperture 7 that is utilized to provide distance compensation of illuminance as the specimen moves toward and away from the aperture 7.

Since the light incident on the specimen approaches that of a collimated beam, the size and shape of the light pattern on the surface within the range $\Delta d$ will not change.

In the example shown in FIG. 1, the angle of viewing is at 0° from a normal to the specimen surface and the angle of illumination is shown at approximately 37°; however, these angles may be varied within reasonable limits, although obviously the angle between viewing and illumination must be greater than 0°, but should not be so large that a reflected image will not exist at the aperture. The size of the angle is not critical until the aperture design has been determined, after which the angle cannot be changed.

The aperture configuration is designed in accordance with the rate at which the reflected light image from the specimen and through lens 6 moves across the aperture surface so as to produce a desired relationship, as will be explained below.

When the specimen is in the lower position (5) the reflected light image as formed by lens 6 fills the square cutout of the aperture without spilling over onto the solid surface next to or opposite the triangular cutout 7a (FIG. 2). As the specimen surface is raised toward the aperture, the reflected light at the aperture increases in intensity and also begins to move toward the triangular cutout across the opaque bar 7b (FIG. 3). The amount of light arriving at the sensor surface 9 remains constant since the decrease in the amount or size of the reflected light passing through the aperture and falling on the fiber bundle compensates for the increase in intensity. At a certain point the light reaching the sensor begins to fall off. However, at this point the reflected light begins to enter the triangular area. Due to the shape and orientation of this triangular cutout, the amount of light passing through the opening will increase as the reflected pattern moves across the aperture surface. As is well known, the fiber ends accept light most efficiently when the light is normal to the fiber end and the acceptance efficiency falls off rapidly as the angle deviates from normal. The configuration of the triangular opening is such that this process compensates for the decrease in acceptance of the fiber bundle to the light as the pattern becomes incident at an increasing angle from the normal and to the increased reflection of the lens at the edge, resulting in a decrease in lens efpirically.

The total aperture area, including the triangle, must be designed so that as the image moves to the left in FIG. 1, the amount of light passed through the aperture remains constant. This is accomplished by designing the configuration of the triangle to admit the proper amount of light as the image moves to the left. The relationship is not linear and can be computed or determined empirically.

The effect of the light spilling over into the triangular area is to increase the illumination to the sensor, in this case the fiber bundle 9, bringing it once again to a constant level after beginning to fall off. The transition is very smooth and no abrupt change in intensity is noticed at the sensor.

The preceding explanation has been limited to a single beam light source. The concept can also be applied to multiple beam systems where increased specimen illumination is desired, as shown in FIG. 4. For multiple systems, additional design steps must be considered for the compensating concept to hold true. In FIG. 4, corresponding parts are given the same numerals as in FIG. 1, except that primes (') are used for the additional light source and associated elements.

First, the lamp source positions should be symmetrical about an axis drawn from the center of the sensor through the center of lenses 6 and 8 and aperture 7 to the specimen surface. The angle of incidence from a normal to the specimen surface when in position 5 for each beam should be the same. When the specimen is in position 5 (lower limit of compensation), each of the incident source beams should coincide on the specimen. Each of the lamp sources should be matched so that the color temperature (spectral characteristics) of each is the same. Corresponding lenses 2 and 2' as well as 4 and 4' should have the same focus characteristics. Each of the apertures at position 3 should have an identical pattern. Since aperture 7 is common to the reflected light from each of the beams, it must incorporate one additional cutout compensating pattern (triangular area) for each additional source beam. This additional cutout is located on the aperture at a position that is opposite and furthest away from the corresponding lamp source, as shown in FIG. 4.

Other configurations for compensating aperture 7 can be used. For a large number of source beams the center pattern might be circular with corresponding triangular patterns around the perimeter for each of the incident beams. The cutout pattern for each of apertures 3 would have to have an elliptical configuration, causing the incident beam on the specimen surface to be circular.

Instead of a physical cutout in the mask, the mask could be of opaque material having transparent areas, as by the use of photographic film or deposited metal film.

I claim:
1. An optical instrument for measuring a characteristic of the amount of light reflected by a specimen from a fixed constant light source, including
    (a) a first mask having a light-transmitting aperture defining a fixed pattern adjacent said light source,
    (b) a condenser lens arranged to focus a collimated beam of light from said source in said fixed pattern, at an angle greater than 0° from the normal, onto the surface of a specimen to be tested,
    (c) receptor means for receiving and measuring light from said specimen at an angle normal to the specimen,
    (d) a second mask having a compensating aperture between said specimen and said receptor means,
    (e) a receptor projection lens arranged to focus the reflected light pattern from said light source on said specimen on the plane of said second mask, said compensating aperture having a configuration corresponding to the light image received from said specimen when the specimen is at a predetermined distance from the receptor lens.
    (f) said compensating aperture configuration being such as to pass a constant amount of light from the specimen when the specimen moves closer to the aperture and the light image from the specimen moves partly out of correspondence with the aperture.
2. The invention according to claim 1, said mask containing a secondary aperture spaced from the first aperture and arranged to receive some light from the specimen as the specimen moves still closer to the mask.
3. The invention according to claim 2, said second aperture being shaped to permit a constant amount of light to reach the receptor through both apertures as the specimen moves closer to the mask.
4. The invention according to claim 1, and a further lens between the second mask and said receptor means for focusing the scrambled reflected light pattern, existing at said projector lens and passing through said second mask, on to said receptor means.
5. The invention according to claim 1, and a second fixed light source, second mask and second condenser lens arranged to focus a second collimated beam onto the same area of the specimen as the first collimated beam, said mask containing a second secondary aperture arranged to receive light from the specimen.

References Cited
UNITED STATES PATENTS
1,917,379   7/1933   Lowry.

RONALD L. WIBERT, Primary Examiner

O. B. CHEW II, Assistant Examiner

U.S. Cl. X.R.
356—199, 210